US010382465B2

(12) United States Patent
Gupta

(10) Patent No.: US 10,382,465 B2
(45) Date of Patent: Aug. 13, 2019

(54) PATTERN MATCHING BASED DATASET EXTRACTION

(71) Applicant: Virsec Systems, Inc., San Jose, CA (US)

(72) Inventor: Satya Vrat Gupta, Dublin, CA (US)

(73) Assignee: Virsec Systems, Inc., San Jose, CA (US)

( * ) Notice: Subject to any disclaimer, the term of this patent is extended or adjusted under 35 U.S.C. 154(b) by 268 days.

(21) Appl. No.: 15/411,605

(22) Filed: Jan. 20, 2017

(65) Prior Publication Data

US 2017/0214705 A1 Jul. 27, 2017

Related U.S. Application Data

(60) Provisional application No. 62/286,282, filed on Jan. 22, 2016.

(51) Int. Cl.
*H04L 29/06* (2006.01)
*G06F 16/2457* (2019.01)
(Continued)

(52) U.S. Cl.
CPC ...... *H04L 63/1425* (2013.01); *G06F 16/2457* (2019.01); *G06F 21/552* (2013.01); *G06F 21/554* (2013.01); *G06F 21/577* (2013.01); *G06F 21/6227* (2013.01); *H04L 63/0428* (2013.01); *H04L 63/1408* (2013.01);
(Continued)

(58) Field of Classification Search
CPC . H04L 63/14; H04L 63/1416; H04L 63/1425; H04L 63/1408; H04L 63/1433; H04L 63/1466; H04L 63/1441; H04L 63/08; G06F 21/55; G06F 21/552;
(Continued)

(56) References Cited

U.S. PATENT DOCUMENTS 6,782,478 B1 8/2004 Probert
8,578,487 B2 * 11/2013 Soeder ................ G06F 21/6227
726/1

(Continued)

OTHER PUBLICATIONS

International Search Report and Written Opinion for PCT/US2017/014354 dated May 4, 2017 entitled "Pattern Matching Based Dataset Extraction".

*Primary Examiner* — Khalil Naghdali
*Assistant Examiner* — Shaqueal D Wade
(74) *Attorney, Agent, or Firm* — Hamilton, Brook, Smith & Reynolds, P.C.

(57) ABSTRACT

Example systems generate a dataset for tuning an analyzer to probe activities related to a web facing application. The systems capture data streams received at a framework of the application. The systems also capture a first set of functions, a second set of functions, and database queries triggered by the framework processing the data streams. The systems match: (i) the first set of functions to packets of the data streams and (ii) the second set of functions to the database queries. For example, the systems may pattern match: (i) data in parameters of the first set of functions to data in fields of the packets and (ii) data in parameters of the second set of functions to data in expressions of the database queries. The systems extract matched functions and database queries into the dataset and probe activities of the application based on the dataset to detect security attacks.

22 Claims, 10 Drawing Sheets

(51) Int. Cl.
  *G06F 21/57*  (2013.01)
  *G06F 21/55*  (2013.01)
  *G06F 21/62*  (2013.01)
(52) U.S. Cl.
  CPC ...... *H04L 63/1433* (2013.01); *H04L 63/1441* (2013.01); *H04L 63/1466* (2013.01); *H04L 63/14* (2013.01)
(58) Field of Classification Search
  CPC .. G06F 21/554; G06F 21/557; G06F 21/6227; G06F 17/30522
  See application file for complete search history.

(56) References Cited

U.S. PATENT DOCUMENTS

| | | |
|---|---|---|
| 8,958,546 B2 | 2/2015 | Probert |
| 9,230,455 B2 | 1/2016 | Probert |
| 2004/0186882 A1 | 9/2004 | Ting |
| 2008/0002882 A1* | 1/2008 | Voloshynovskyy ... G07D 7/005 382/181 |
| 2008/0229415 A1 | 9/2008 | Kapoor et al. |
| 2011/0238855 A1* | 9/2011 | Korsunsky ............. G06F 21/55 709/231 |
| 2012/0117644 A1 | 5/2012 | Soeder |
| 2013/0160130 A1* | 6/2013 | Mendelev .............. G06F 21/56 726/25 |
| 2014/0108803 A1 | 4/2014 | Probert |
| 2014/0337639 A1 | 11/2014 | Probert |
| 2016/0094349 A1 | 3/2016 | Probert |

* cited by examiner

PATTERN MATCHING BASED DATASET EXTRACTION

RELATED APPLICATION

This application claims the benefit of U.S. Provisional Application No. 62/286,282, filed on Jan. 22, 2016. The entire teachings of the above application are incorporated herein by reference in their entirety.

BACKGROUND

With each passing day, cyber-attacks are becoming increasingly sophisticated. Attacks are targeted to exploit specific vulnerabilities in specific applications. The cause and effects of such attacks are not discernible at the network layer because these attacks extend beyond the most simplistic attacks and do not trigger network activity that can be construed as overtly malicious. Enterprise databases are preferred targets for attackers since highly valuable information, such as credit card numbers, customer social security numbers, health records, other personally identifiable information, detailed customer lists, design plans, source code, and other intellectual property resides in these databases. In order to deal with these targeted attacks, many vendors have deployed cyber security products, such as next generation firewalls and web facing application firewalls which attempt to tie user access and behavior to markers in the application, or sandboxing technologies which attempt to run what the vendors consider to be suspicious code, in a sandbox and wait for such code to perform observable malicious activities. To cope with such detection mechanisms, malware often adapts its behavior, such as waiting for the detection engine to give up looking before the malware unleashes its malicious intent. These changes in behavior hamper the contemporary cyber security solution's ability to recognize the behavior of the attack and, therefore, their ability to detect the presence of malware in a timely fashion.

SUMMARY

A very large number of malware attacks of computer applications today result from the ability of a malicious actor to either inject and later execute malicious content or extract data from the databases by supplying especially crafted input data. These malicious activities can be accomplished unbeknownst to the information technology (IT) organization of the enterprise. The process of injecting such malicious content involves identifying and exploiting poorly designed code that performs inadequate input validation. The current cyber security technologies either attempt to observe malicious content in the network traffic, its source, or trace the network behavior of the application and hope the network behavior exhibits some previously catalogued abnormal activity, or screen the behavior of suspicious code in a sandbox before dispatching it to a server for execution. These technologies do not have the capability to examine the real web facing applications in real-time at a low enough granularity to reliably detect root cause triggers that are manifested along with the execution of such malicious content.

An obstacle in detecting such root cause triggers is the inability to trace the processing of data streams through the application's framework and business logic. Embodiments of the present invention capture the large amount of data packets of data streams received at the framework and further capture the large amount of functions, their parameters, and database queries triggered during the processing of the received data streams. This includes capturing the aforementioned information in both the framework and the business logic. Other embodiments of the present invention also capture the thread ID and addresses of the instructions that read or write to memory and the address and range of memory operated upon. These embodiments further use pattern matching and machine learning to isolate from this large amount of captured data the packets, functions, and database queries, thread ID and memory operations specific to an application and correlate the relationships between these isolated packets, functions, queries, and memory accesses. The isolated and correlated packets, functions, queries, thread ID, and memory accesses, along with certain context data such as user, session, IP address, port, protocol, thread, code address, memory operation (read/write) targeted memory address and range and the like are extracted to a dataset. An analyzer may be tuned according to the dataset to listen for a set of correlated packets, functions, and queries to track and probe activities related to a particular application. Such tuning enables the analyzer to reliably detect root cause triggers that precede the execution of such malicious content. For example, such tuning enables the analyzer to examine in isolation function and machine code instructions that handle user supplied data to determine how they handle the malicious content.

Embodiments of the present disclosure are directed to systems and methods that generate a dataset for tuning an analyzer to probe activities related to a particular application. The systems and methods capture data streams received at a framework of an application. In example embodiments, the framework may be written in accordance with at least one or more of: Binary, .NET, JAVA, PHP, Ruby, and Python languages. In some embodiments, a first traffic analyzer or packet capture tool may be configured to capture the data streams. The systems and methods further capture a first set of functions triggered by the framework processing the data streams. In some embodiments, a first profiler may be configured to capture the functions, thread ID, and the memory accesses performed by the application.

The systems and methods match a subset of the first set of captured functions to data packets of the captured data streams. In some embodiments, a pattern matching engine may be configured to perform the matching. In some embodiments, matching the subset of the first set of captured functions includes pattern matching data in parameters of these functions, thread ID, and/or memory access to data in fields of the data packets. The systems and methods extract the matched subset of the first set of captured functions, and/or thread ID, and memory accesses into a dataset. The systems and methods probe activities of the application based on the extracted dataset to detect cyberattacks.

In some embodiments, the systems and methods capture a second set of functions triggered by the framework processing the data streams. In some embodiments, a second profiler may be configured to capture the second set of functions, thread ID, and the memory accesses performed by the application. In these embodiments, the systems and methods also capture database queries generated by the framework to a database server. In some embodiments, a second traffic analyzer or packet capture tool may be configured to capture the database queries. In these embodiments, the systems and methods match one or more of the captured database queries to a subset of the second set of captured functions. The matching of the one or more of the captured database queries includes pattern matching data in parameters of the second set of captured functions to data in expressions of the captured one or more database queries. In these embodiments, the systems and methods further extract the matched one or more captured database queries and the matched subset of the captured second set of functions into the extracted dataset.

In some of these embodiments, the systems and methods also correlate relationships between the matched data packets, matched subset of the captured first set of functions, matched subset of the captured second set of functions, matched contents of memory accesses, and matched one or more database queries. The systems and methods map the matched data packets, matched subsets of captured functions, matched contents of memory accesses, and matched one or more database queries in the dataset based on the correlated relationships. The systems and methods also probe activities of the application based on the mapping of the matched data packets, matched subsets of captured functions, matched contents of memory accesses and matched one or more database queries in the extracted dataset.

In some embodiments, the systems and methods capture contents of each memory access during the processing of the data streams. The systems and methods compare the extracted dataset with each captured memory access to identify instructions of the captured first set of functions and second set of function used in processing user data. The systems and methods create a chain of the identified instructions, such that the chain extracted to the dataset represents vulnerabilities to be monitored in the web facing application. The systems and methods probe the activities of the web facing application at runtime by monitoring for the created chain of instructions, the probing including adding user content at output of each captured function and removing context from input of each captured function. In example embodiments, the captured first set of functions are triggered by the framework at an interface to a business logic layer of the framework and the captured second set of functions are triggered by the framework at an interface from the business logic layer of the framework.

In some example embodiments, the capturing of the data streams further comprise the systems and methods decrypting the data streams based on a protocol configuration of the framework. In some example embodiments, the systems and methods also extract at least one of: user, user data, session information, IP address, port number, protocol context, thread context, and traffic direction from processing of the data streams into the extracted dataset for probing activities of the web facing application.

In some example embodiments, the systems and methods probe the activities by capturing a data packet received at the framework of the web facing application at runtime. In example embodiments, a third traffic analyzer is configured to capture the data packets. The systems and methods further capture each triggered function of the matched subset of the captured first set of functions and the matched subset of the captured second set of functions in the extracted dataset in the dataset, and capturing each triggered database query of the captured database queries in the dataset. In example embodiments, a third and fourth profiles are configured to capture the first and second set of functions, respectively, and a fourth traffic analyzer is configured to capture the database queries. The system and methods, for each triggered function of the first set of functions, checking for triggering of the mapped subset of the second set of functions and trigger of the mapped one or more database queries. The system and methods declare a security attack if the data of the captured packet does not match the data in parameters of each triggered function and the data in the expressions of each triggered database query.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION

A description of example embodiments of the disclosure follows.

The teachings of all patents, published applications and references cited herein are incorporated by reference in their entirety.

Example Malware Attacks

Figure 1:
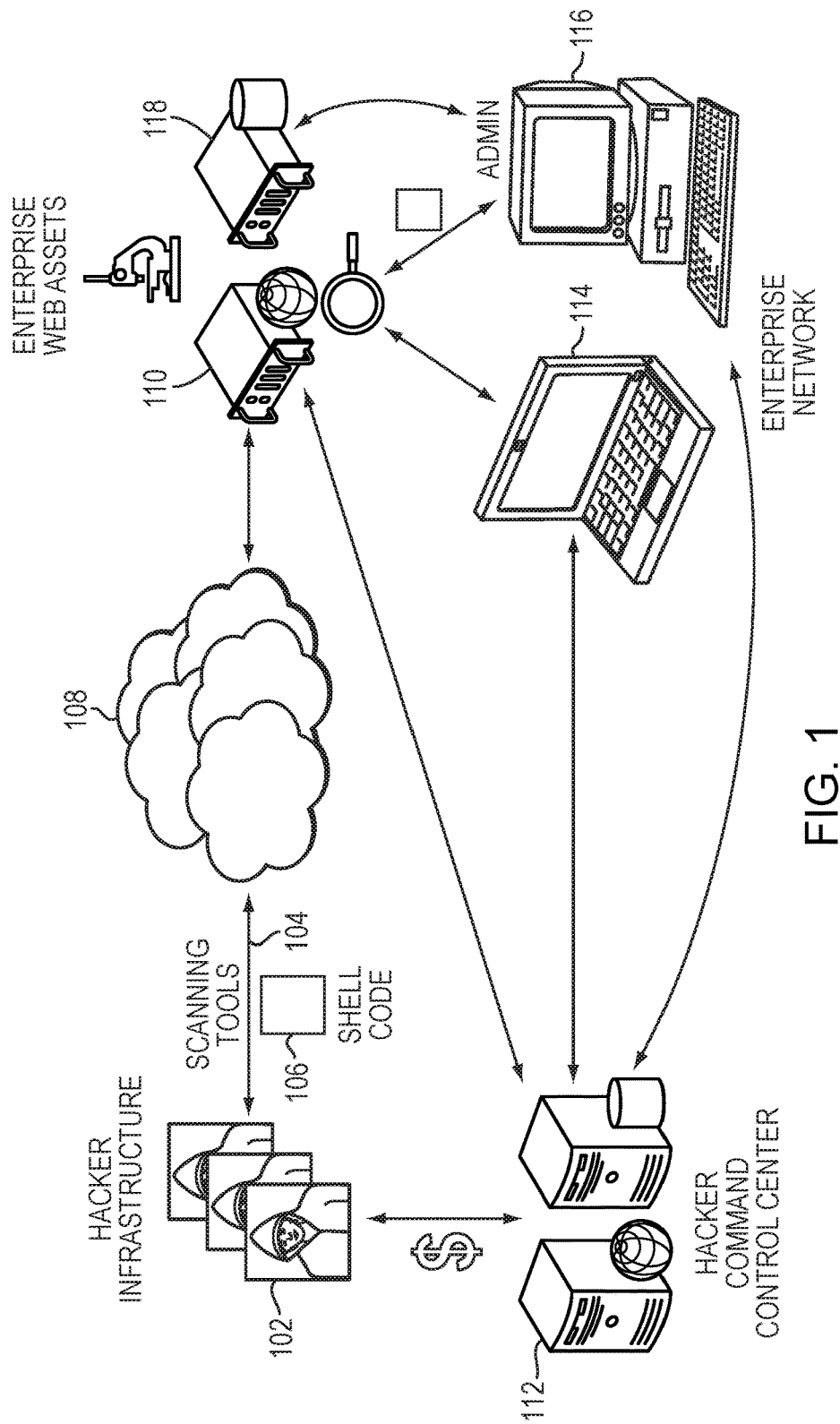
FIG. 1 illustrates an example configuration of an advanced persistent malware attack.

FIG. 1 illustrates an example of an advance persistent malware attack. In this scenario, a malicious actor (or hacker) from the actor's own infrastructure 102 remotely scans the customer facing infrastructure of an enterprise 108 using scanning tools such as nmap 104. When the scan finds code that has either a known vulnerability or zero-day vulnerability, the actor installs shell code 106 to gain control of the remote enterprise server (i.e., target) 110 and access the enterprise network. Once inside the network, the malicious actor loads additional tools to facilitate attacking the application. These tools may include nmap, port scanners, password cracking tools, ftp client, compression tools, hashing, and/or encryption and decryption tools.

The actor then accesses the enterprise infrastructure looking for a machine 114 or 116 from which a user with elevated privileges logs into valuable targets, such as databases and file repositories. The actor is looking for the machine 114 or 116 for the purposes of scraping the access credentials of the user and for finding a home for more hacking tools. Upon finding a machine with vulnerable applications 114 or 116, the malicious actor can connect back to their remote Hacker Command Control Center 112, scrape for credentials, infiltrate and subsequently access the target 110. Once the target is accessed, additional tools of the trade are loaded onto the target 110. Malware can also be deposited onto mobile devices such as smartphones and laptops of privileged users as they take their machines through unprotected networks such as coffee shops, airports, and hotels. In another scenario, an insider may infect the target machines with viruses or other malware attacks even as the processes executed by the applications are running.

Enterprise databases are preferred targets for malicious actors since information that is highly valuable to the enterprise may be getting accessed by a privileged user. For example, in these databases, a privileged user has access to large chunks of confidential customer information regarding all customers, while a regular user only has access to parts of the confidential information pertinent to only themselves. After credentials have been obtained, the malicious actor can connect to the databases and file repositories 118 as a privileged user and extract the valuable confidential information, such as real names, home addresses, social security, driver licenses, birth dates, medical records, financial information such as credit/debit card numbers, phone numbers, email addresses, user names and passwords, insurance information, detailed customer lists, design plans, and source code or other intellectual property.

The malicious actor can optionally compress and encrypt this information and upload it to the Hacker Command Control Center 112 in small chunks so as to not draw attention of the enterprise security analysts. To achieve this objective, the malicious actor may change the IP addresses of the Hacker Command Control Center 112 on a daily basis or use proxies so that intrusion detection systems in the enterprise cannot establish a pattern. An enterprise typically sends and receives over 10 GB of data every day; therefore uploading relatively small amounts of data in short bursts often goes unnoticed.

In another scenario, the malicious actor may use a database query injection attack, such as a SQL injection attack, to first drop a web shell and then proceed on to extract valuable confidential information regarding enterprise clients or customers. Further, in the same manner, a malicious actor can leverage a Remote File Injection (RFI) attack to insert additional functionality into a web facing application. Such functionality can be accessed by the malicious actor using completely benign user input, but when the injected functionality is executed, it may unintentionally install web shells and/or reveal confidential information to the malicious actor.

Such attacks succeed because without being able to probe the processing pipeline in a web facing application framework for a particular web facing application, a cyber-security solution cannot determine if a malicious actor has interfered with or altered data related to the processing of the particular web facing application. Cyber-security solutions, such as web facing application firewalls and intrusion detection/prevention engines cannot be tuned to track the granular processing for a particular web facing application in a web facing application framework. This is in part because cyber-security tools do not exist that enable isolation and correlation from the large amount of data received and processed by a web facing application framework, the particular data, functions, database queries, thread ID, and contents of memory accesses utilized for processing an application. Without such isolated and correlated data, these cyber-security solutions cannot effectively detect the attacks by malicious actors through an application.

Web Facing Application Infrastructure

Figure 2:
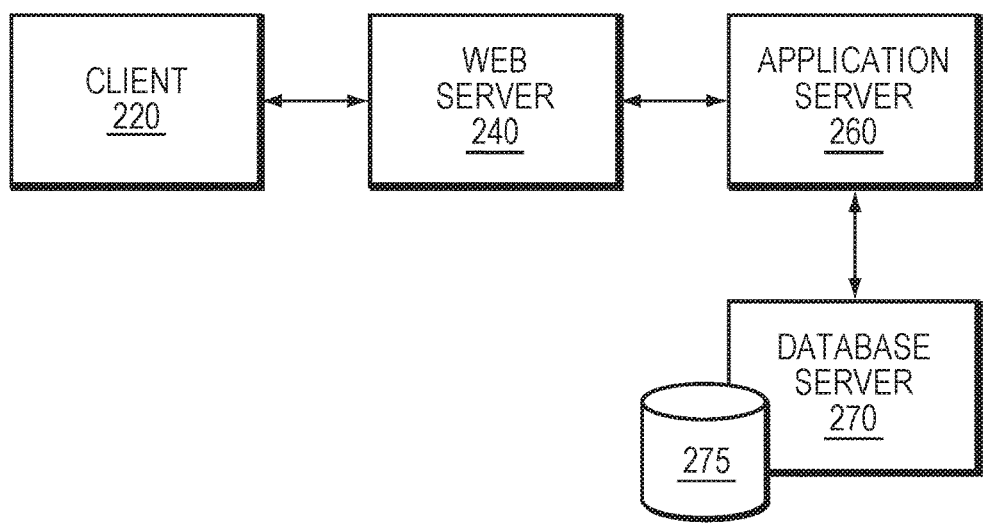
FIG. 2 illustrates an example application infrastructure in embodiments of the present disclosure.

FIG. 2 illustrates an example web facing application infrastructure that may be vulnerable to security attacks. The infrastructure includes a remote web client 220 from which a user or machine generates a web request for performing a transaction at a particular website. The user or machine may generate the web request by entering an URL, selecting a graphical option which enters the URL for the user, and the like. The web client 220 sends the web request (e.g., as a HTTP, SOAP, REST or other standard or non-standardized Request) to the web server 240, which may receive the web request, along with web requests from a large number of other users, as data streams. The web server 240 is operatively coupled to the application server 260 for processing the data streams. The web server 240 and application server 260 are configured in a web facing application framework type, including, but not limited to, Binary, .NET, JAVA, PHP, Ruby, Python, and such. The web facing application framework may be separated into logical layers, including, but not limited to, a presentation logic layer, a business logic layer, a data logic layer, and such.

The received data streams are intercepted and processed in a pipeline through the logical layers of the web facing application framework (at the web server 240 and application server 260). The typical web facing application also queries a database to leverage more services provided at the output of the framework. Thus, within the processing pipeline of the web facing application framework, the application server 260 may further send the data streams to a database server 270. At the end of the processing pipeline, the application server 260 may communicate the data streams to a (backend) database 275. The database server 270 may communicate the data streams to the database 275 as database queries (e.g., SQL queries, Stored Procedure Calls, etc.) to retrieve data records from the database 275 related to the web requests. The database server 270 may return data from retrieved data records to the requesting users. To do so, the data server 270 sends this data, as data streams, back through the processing pipeline of the framework in the opposite direction to the web server 240. The web server 240 sends this data (e.g., as HTTP Responses) back to the remote web client 220 associated with the corresponding user.

Embodiments of the present invention capture the data streams at different stages in the processing pipeline through the logical layers of the framework. Depending on the stage, the data streams may be captured as raw data from data packets (e.g., raw TCP data), captured as functions triggered by the framework to process the data streams, captured as memory accesses, captured as database queries triggered by the framework to retrieve database records, and such. These embodiments perform patterning matching and correlation on the captured raw data, functions, and database queries to extract a dataset indicating the processing pattern for a particular web site (web facing application) at various stages of the framework.

Web Facing Application Framework

Figure 3:
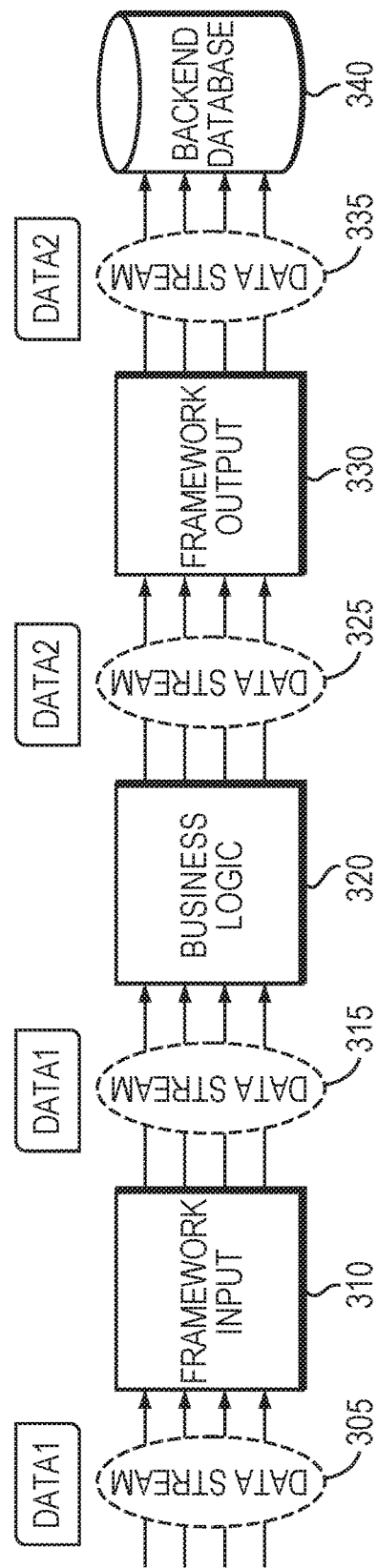
FIG. 3 illustrates a block diagram of an application framework in embodiments of the present disclosure.

FIG. 3 illustrates a block diagram of a web facing application framework in embodiments of the present disclosure. Most web facing applications are built to run or be hosted in "containers" provided by an application framework, as shown in FIG. 3. In this paradigm, the application framework provides commonly used capabilities such as authenticating users, encryption, session management, SQL Connectors etc. Some examples of containers include Apache Tomcat, JBoss, Oracle Web Logic, IBM Web Sphere, and the like. These frameworks greatly ease the burden on the application developer who can now focus on developing the business logic. In example embodiments, the web facing application framework may be configured across the web server 240 and application server 260 of FIG. 2. The web facing application framework may be of type: Binary, .NET, JAVA, PHP, Ruby, Python, or any other such standard or proprietary framework language type.

In FIG. 3, data streams 305 of large amounts of data, including Data 1, are input to the processing pipeline of the framework from a communication network (e.g., the Internet). Note that different web servers 240/application servers 260 may be configured in different frameworks having different processing pipelines. The data of the data streams 305 are from multiple users concurrently using the application. The data streams 305 may arrive at the processing pipeline of the framework (Framework Input 310) as raw data packets (e.g., Ethernet frames) from communication protocols such as HTTP, FTP, SMTP, VOIP, RDP, Web Socket, and the like. These data streams 305 may be encrypted and/or fragmented. For example, in some embodiments, Data 1 may be a HTTP request for a particular website (web facing application) from a user via a user client device 220. The Business Logic 320 configured at the Business Logic layer of the framework may be the logic for this particular website.

The data streams 305 including Data 1 continue in the processing pipeline through one or more layers of the framework, such as the Business Logic Layer 320 shown in FIG. 3. As the data streams 305 continue through the processing pipeline, they are consumed and generated by multiple stages of processing into altered data streams 315, 325, 335. These processing stages are performed by the triggering of specific functions, or methods and more specifically by CPU instructions as these execute. For example, the data stream 315 including Data 1 is consumed in the processing pipeline by the Business Logic layer 320 to generate the data stream 325 including Data 2. The data streams 335 may exit the processing pipeline (Framework Output 330) and complete processing by triggering database queries to retrieve record data from a backend database (such as database 275 of FIG. 2). Data streams, including the record data retrieved from the backend database may be sent back through the processing pipeline of the framework (in the opposite direction), where the data streams are similarly consumed/generated by multiple stages of processing.

Pattern Matching Based Dataset Extraction of Unencrypted Data Streams

Figure 4:
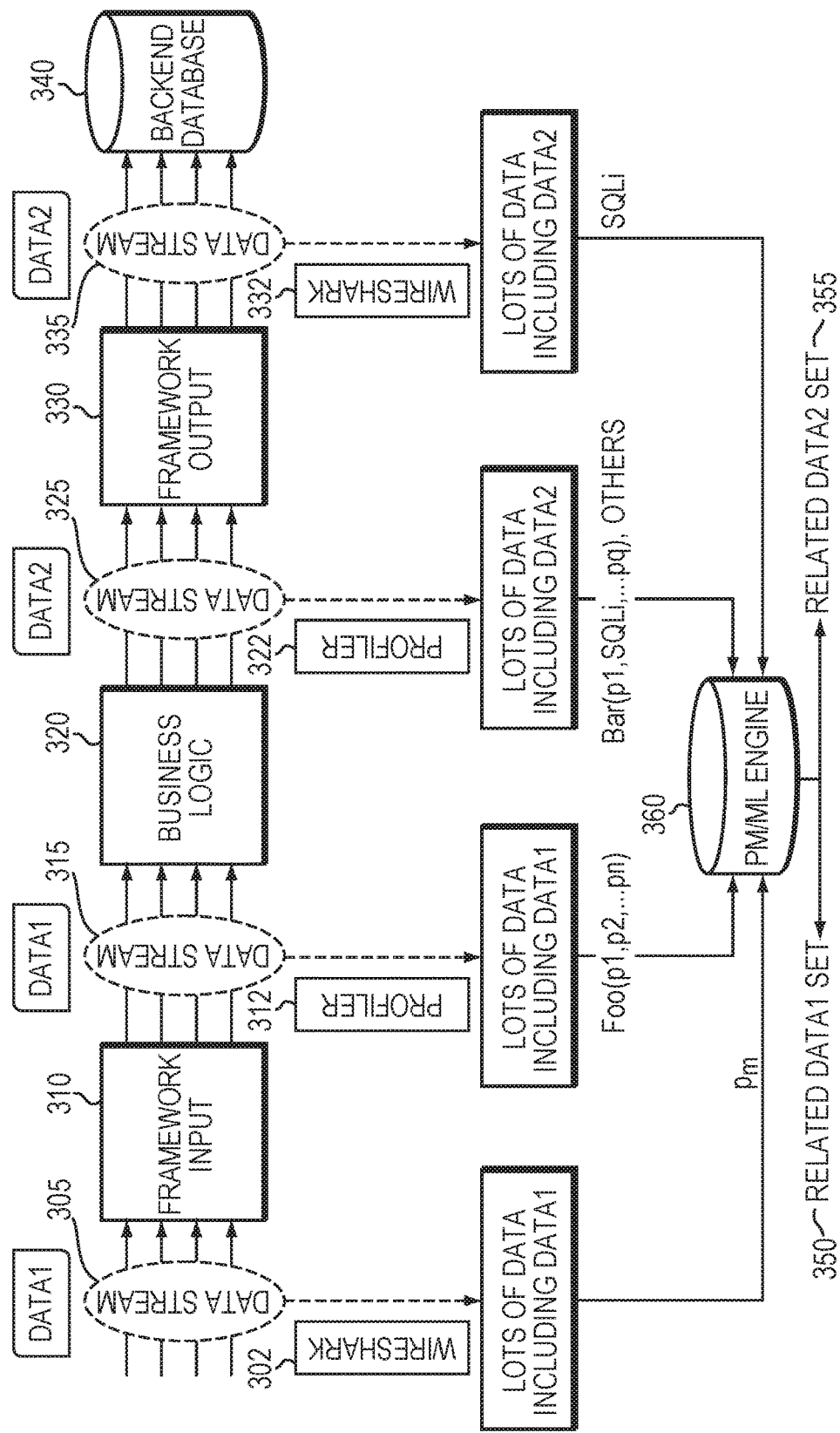
FIG. 4 illustrates a block diagram of pattern matching based dataset extraction in an unencrypted data stream in embodiments of the present disclosure.

FIG. 4 illustrates a block diagram of pattern matching based dataset extraction in an unencrypted data stream in embodiments of the present disclosure. In FIG. 4, a packet capture application or tool 302 is configured to capture the input data streams 305 of large amounts of data, including Data 1, arriving at the processing pipeline of the framework (Framework Input 310). FIG. 4 illustrates the use of the Wireshark packet capture tool, but in other embodiments any other packet capture tool/application may be used without limitation. The packet capture tool/application captures raw data packets from the data streams 305 including Data 1 based on the framework type. For example, data packets associated with a particular framework (e.g., PHP) may include a particular data header or other particular field that may be recognized (listened for) by the packet capture tool/application. The packet capture tool/application sends a portion (Pm) of data (e.g., TCP data) from the captured raw data packets to a pattern matching/machine learning engine 360 for recording and processing. In some embodiments, the data may be transformed to the pattern matching/machine learning engine 360 using streaming transport, such as pipes. From the portion of data, the pattern matching/machine learning engine 360 may extract specific data items, including user, session information, communication protocol, IP address, port number, traffic direction, and such without limitation.

In FIG. 4, a profiler application/tool 312 is configured to profile (capture) the data streams 315, including Data 1, in the processing pipeline of the framework and the Business Logic 320 for the particular application. Note, embodiments use both language specific profilers, which intercept function entry points, and binary profilers, which intercept individual instructions. At this processing stage, the framework triggers functions or methods and instructions that trigger memory access to process (consume and generate) the data streams 315 including Data 1. In order to determine the specific functions used to process Data 1, the profiler 312 captures all the functions triggered by the framework at this stage of the processing pipeline. For example, the profiler 312 captures the function Foo(p1, p2 . . . pn) triggered by the framework. The profiler 312 then sends the profiled functions, thread ID, and the contents of the parameters to the pattern matching/machine learning engine 360, which matches the profiled functions to the raw data packets captured by the packet capture tool/application 302. In particular, the pattern matching/machine learning engine 360 performs pattern matching, which correlates the data parameters of the profiled functions to the extracted data items of the captured raw data packets to identify and isolate the specific functions triggered to process Data 1. The pattern matching/machine learning engine 360 extracts and records these specific functions in a dataset as (Related Data 1 Set) 350 for the particular application. In the dataset, the specific functions may be mapped (linked) to the data of the associated raw data packet, which indicates the processing pattern of the framework and the particular application.

In FIG. 4, another profiler application/tool (e.g., SQL Profiler) 322 is also configured to profile the data streams 325, including Data 2, in the processing pipeline of the framework that accesses the backend systems or databases. Note that the data streams 315 including Data 1 are consumed in the processing pipeline by the application's core business logic 320 to generate the data stream 325 including Data 2. At this processing stage, the framework triggers functions or methods and memory accesses to process (consume and generate) the data streams including Data 2. The profiler profiles all the functions, thread ID, and memory accesses triggered by the framework at this stage of the processing pipeline and sends the profiled functions, thread ID, and memory accesses to the pattern matching/ machine learning engine. For example, the profiler 322 profiles/sends the function Bar(p1, SQLi, . . . pq) triggered by the framework. The pattern matching/machine learning engine 260 may particularly identify and isolate functions directed to accessing data records from backend databases 340, such as functions that include parameters related to database specific commends (e.g., SQL commands).

Further, another packet capture tool/application 332 (e.g., WireShark or TCPDump) is configured to capture the data streams 335, including Data 2, directed to the backend databases 340. The packet capture tool/application 332 may capture the data streams 335 as they leave the server 270 and traverse to the database over IPC mechanisms, such as TCP/IP sockets. These data streams 332 including D2 are generated in the processing pipeline of the framework from the triggered functions. The packet capture tool/application captures raw data packets from the data streams 332 including Data 2 based on the framework type. For example, data packets associated with a particular database type may include a particular field that may be recognized (listened for) by the packet capture tool/application. The packet capture tool/application 332 harvests and sends a portion of data (e.g., SQL data) from the captured raw data packets to a pattern matching/machine learning engine 360 for recording and processing. From the portion of data, the pattern matching/machine learning engine 360 may extract specific data items, such as SQL queries or Stored Procedure calls.

The pattern matching/machine learning engine 360 then matches the profiled functions related to database access to the data packets (database queries) directed to the backend database 340 (captured by the packet capture tool/application). In particular, the pattern matching/machine learning engine 360 performs pattern matching, which correlates the data parameters of these profiled functions to the expressions of the SQL queries (SQLi) to identify and isolate the specific functions and specific database queries triggered based on Data 2. The pattern matching/machine learning engine 360 extracts and records these specific functions and database queries in the dataset (Related Data 2 Set) 355 for the particular website (web facing application). In the dataset, the specific functions are mapped (linked) to the specific database queries. The dataset 355 indicates the processing pattern of the backend of the framework for the particular website (web facing application).

Correlating Extracted Datasets

The pattern matching/machine learning engine 360 may further correlate the Related Data 1 Set dataset 350 to Related Data 2 Set dataset 355. The pattern matching/machine learning engine 360 may perform the correlation by the use of context data structures configured for communication between processes or threads of the framework. Such context data structures are used in the processing pipeline of web facing application frameworks. The profilers 312, 322, or operatively coupled computer applications, may insert identifying information (e.g., user, session, or such information) into these context data structures which enables tracing the processes/threads used to process Data 1 to the processes/threads used to process Data 2. The profiler, when capturing the function or database queries triggered by the data streams 325, 335 including Data 2 may also capture the associated processes/threads and corresponding inserted identifying information. The profilers 312, 322 further send the processes/threads and corresponding identifying information to the pattern matching/machine learning engine 360, where they are recorded and mapped to the associated functions and database queries in the respective dataset. The pattern matching/machine learning engine 360 may determine the data/functions of Data Set 1 that are associated to the functions/queries of Data Set 2 by matching the identifying information mapped to the data/functions of Data Set 2 to the identifying information mapped to the data/functions of Data Set 1 or fields/parameters of the data/functions of Data Set 1.

An example of using the context data structures in this manner follows. In an application infrastructure (as shown in FIG. 2), a web server 240 receives a web request (e.g., HTTP requests) from a user (via a web service client). Using information included in the web request (e.g., URL), the web server 240 authenticates the user, and if the authentication is successful, establishes a connection (or session) for the user to access data within the web facing application infrastructure. The web server 240 maintains user and session data to exchange web requests and web responses with the user within the session. The web server 240 and application servers 260 are configured in the web facing application framework, as shown in FIG. 3. During the session, the web server 240 processes the web requests by communicating with the application servers 260 within the web facing application framework (FIG. 3) via inter-dependent mechanisms and threads that utilize Cross-Context containers and local/inter process communications (LPC/IPC). In other embodiments, the web server 240 and application server 260 may communicate within the web facing application framework using any other context data memory structures and any other process communication methods. Note, the context data may be any data structure used to transmit data between servers or other such equipment within a web facing application framework, including any data structures used in Binary, .NET, JAVA, PHP, Ruby, Python, or any other web facing application framework language type without limitation.

The Cross-Context containers (context data) comprise multiple pieces of memory (data objects), including HTTP/Synchronization, Call/Operations, and such, used to hold data shared between the web server 240 and application server 260. These data objects may be formatted as internal data structures or text based memory elements (e.g., in XML, JSON, raw data format). The profilers 312, 322 of FIG. 4 communicate with the web server 240 and application server 260 via instrumented code to extend the context data in accordance with respective data structures shown in Appendix A. For example, the profilers 312, 322 via the instrumented code retrieves user, session, and user input information from the web request received at the web server 2400, including user name (e.g., uuid), IP address, port number, URL, session id, HTTP data, thread ID, memory access type and contents and any other such user/session information.

In this way the profilers 312, 322 have visibility into the user, session, and such associated with the threads used in the processing pipeline of the framework (FIG. 4) to process Data 1 and Data 2. Further, the profilers 312, 322 may captured the threads and the associated user, session, and such, along with the data packets, triggered functions, memory access and triggered database queries in the processing pipeline of Data 1 and Data 2. The profilers 312, 322 may send the threads and associated user/session data from the extended data structure of the context data to the pattern matching/machine learning engine 360 to record these threads and associated user/session data in the Related Data 2 Set dataset 335 mapped to the related data packets, triggered functions, and triggered queries. The pattern matching/machine learning engine 360 may use the user/session data to correlate related functions/queries for Data 2 (in Related Data 2 Set dataset 355) to the data/functions for Data 1 (in Related Data 1 Set dataset 350) based on the user/session data or similar data in the fields/parameters of the data/functions of Data 1. The correlated datasets 350, 355 may be included together in a cumulative dataset that provides the processing patterns for a particular application across the various stages of the framework (end-to-end).

Pattern Matching Based Dataset Extraction of Encrypted Data Streams

Figure 5:
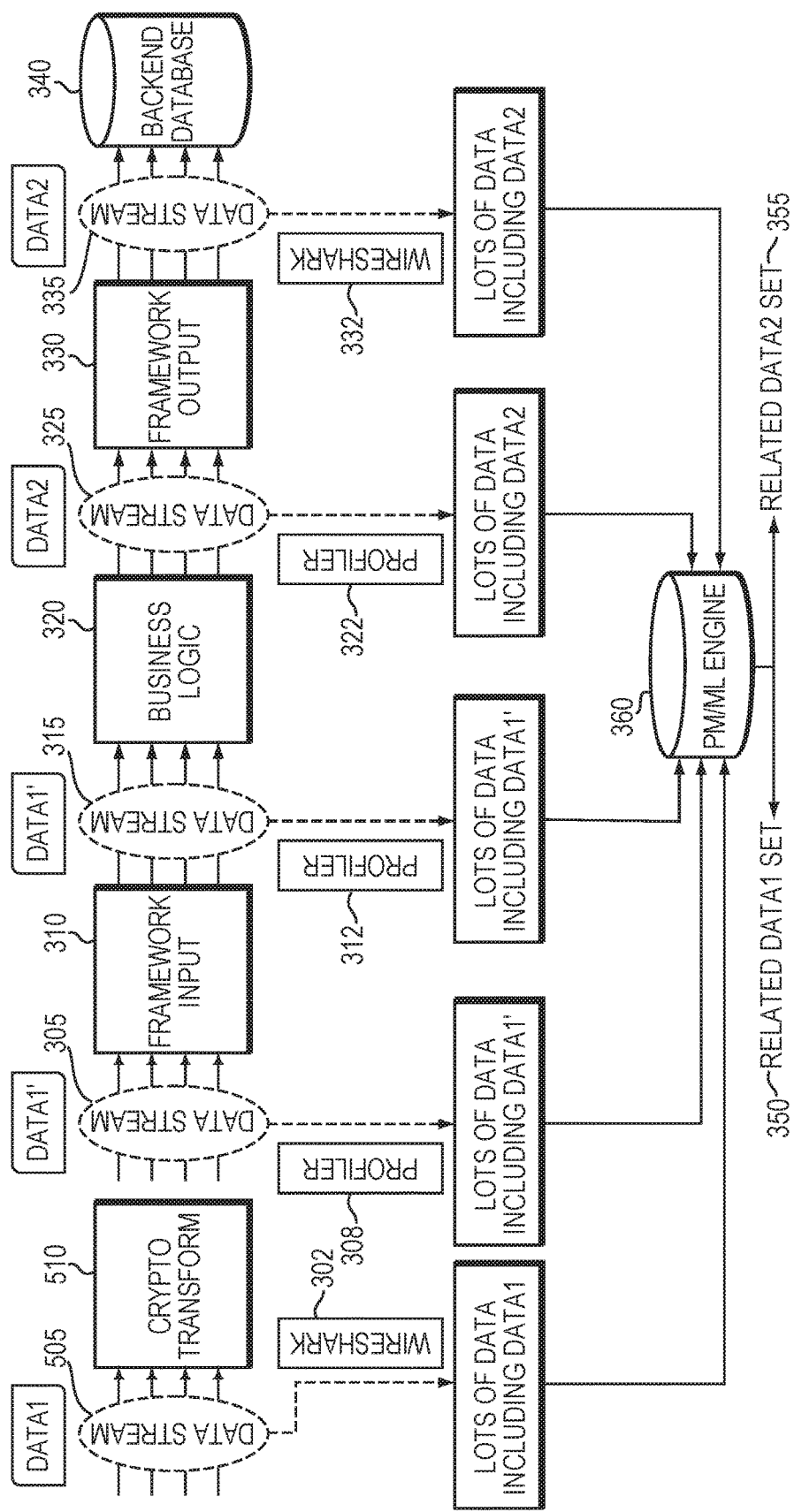
FIG. 5 illustrates a block diagram of pattern matching based dataset extraction in an encrypted data stream in embodiments of the present disclosure.

FIG. 5 illustrates a block diagram of pattern matching based dataset extraction in an encrypted data stream in embodiments of the present disclosure. In the embodiment of FIG. 5, the data streams 505 including Data 1 arriving at the framework are encrypted. The packet capture tool 301 to intercept the encrypted data streams prior to arriving at the framework. Then, the Crypto Transform module 510 is configured convert the data streams 505 to the equivalent decrypted data streams 305. The Crypto Transform module 510 may provide such conversion by determining the encryption protocol (e.g., SSL) used by the framework and decrypt the data packets of the data streams to clear text in accordance with the determined encryption protocol. The Crypto Transform module 510 may reference library functions (e.g., ssl_read, ssl_write, and the like), Application Programming Interface (API) functions, and other such functionality related to the determine encryption protocol in order to perform the decryption of the data packets of the data streams 505. The decrypted data streams 305 will be captured by a profiler 308 (rather than packet capture tool) at the arrival to the framework (Framework Input 310). The data streams 305 are decrypted at the edges of the framework for scalability purposes. That is, by performing decryption at the edges of the framework any business logic that leverages the given framework and type of access (HTTP, REST, SOA, Non-Standard, etc.) can be handled in embodiments of the present invention. The decrypted data streams 305 including Data 1 will continue through the processing pipeline of the framework in the same manner as described in FIG. 4.

Use of Extracted Dataset

The resulting dataset from FIG. 4 or 5 may be used to probe the activities of the application across the various stages of the framework (end-to-end) to detect cyberattacks. An analysis engine, via instrumented code in the framework, may be tuned based on the resulting dataset to listen for the specific functions and database queries to monitor and probe the activities of the particular web facing application. In this way, the analysis engine may eliminate noise in the data streams and focus or filter only on the specific functions or methods, threads and memory accesses that process user data in the application. The dataset may also probe further into the data parameter and fields of the packets, functions, database queries, threads and memory accesses based on the context recorded in the dataset related to the packets, functions, database queries, threads and memory accesses. Further, based on the dataset, the analysis engine may be turned to track and probe activities across the framework for a particular user, session, and the like.

Method of Pattern Matching Based Dataset Extraction

Figure 6:
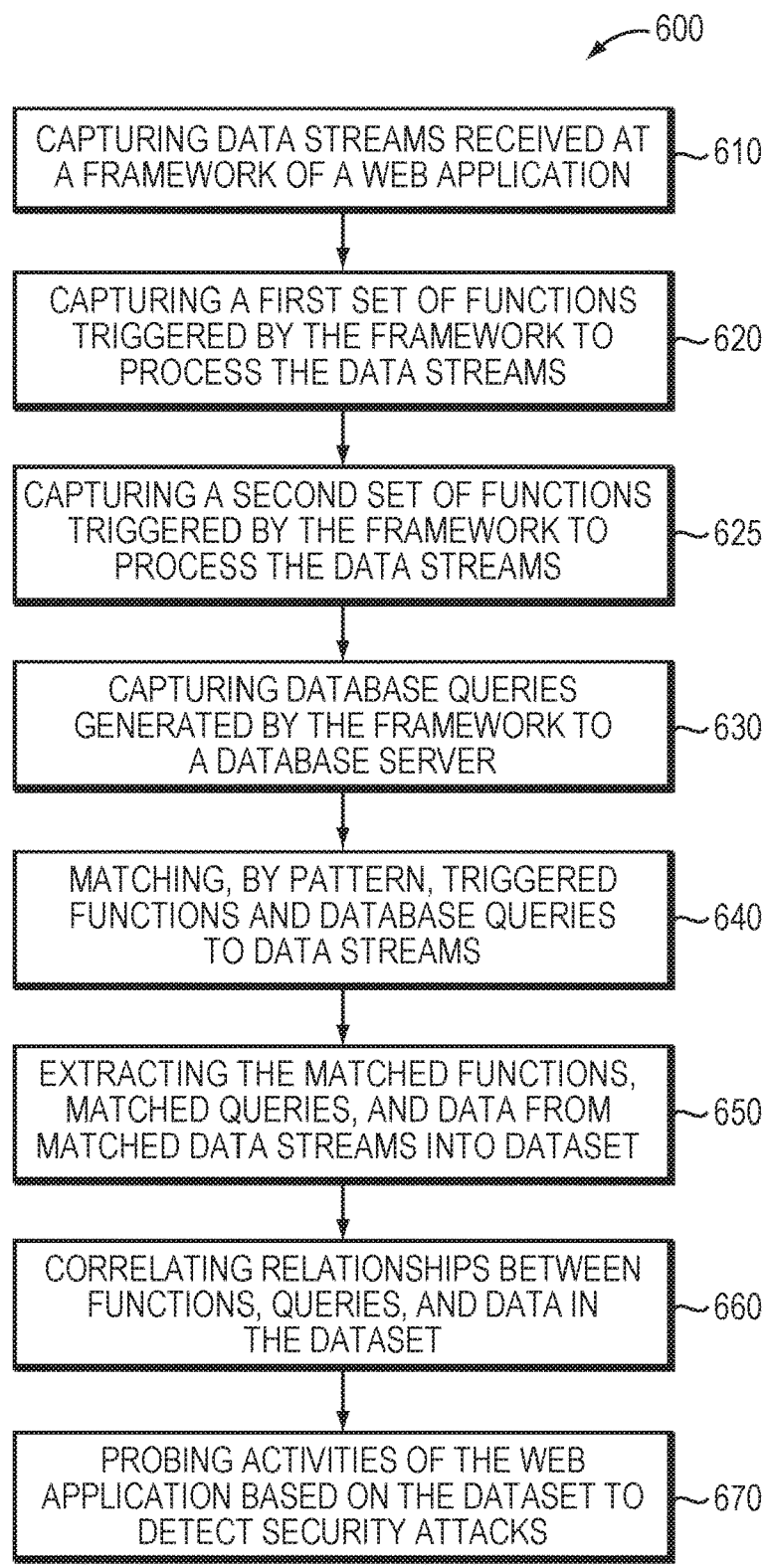
FIG. 6 illustrates a flowchart depicting an example method of pattern matching based dataset extraction in embodiments of the present disclosure.

FIG. 6 illustrates a flowchart depicting an example method 600 of pattern matching based dataset extraction in embodiments of the present disclosure. The method of FIG. 6 begins at step 610 by capturing data streams received at a framework of a web facing application. The method may use a packet capture tool to listen for data packets specific to the framework of the application, and extract particular data portions (e.g., TCP data) of the data packet. At step 620, the method next captures a first set of functions (or methods), thread ID, and memory accesses triggered by the framework to process the data streams prior to processing by the business logic. At step 625, the method next captures a second set of functions (or methods), thread ID, and memory accesses triggered by the framework to process the data streams after processing by the business logic. In some embodiments, the method may also capture the last function in each direction of the framework as part of the first and second set of functions. If the captured function handles a fragment of data, the method may also capture the previous and next function in the processing pipeline of the functions. The method, at step 620, may also extract the parameters, thread ID, memory access, and contents of such accesses and associated data of the captured sets of functions. At step 630, the method then captures the database queries, thread ID and memory accesses generated by the framework over a network to a database server for querying a backend database. The method, at step 630, may also extract the expressions, fields, and associated data of the captured database queries. The method may use profilers to capture the first and second set of functions (steps 620 and 625) and a second packet capture tool to capture the database queries (step 630).

At step 640 of the method, the packet capture tools and profilers send the captured data to a pattern matching/machine learning engine that matches, by pattern, the data packets, triggered first and second set of functions, thread IDs, memory accesses and database queries to data streams. The captured data packets and triggered first set of functions, thread IDs and memory accesses from the frontend of the framework may be matched to a first data stream and the triggered second set of functions and captured database queries of the backend of the framework may be matched to a second data stream. At step 650, the method extracts the matched functions (from the first and second sets of functions), matched Thread IDs, matched memory accesses, matched queries, and data packet in one or more datasets. The method may extract the packets and the matched first set of functions of the first data stream (frontend of framework) to a first dataset and the matched second set of functions and captured database queries of the second data stream (backend of framework) to a second data stream.

The method may also extract information related to some or all of the data packets, functions, and queries, such as user, user data, session information, IP address, port number, protocol context, thread context, thread ID, memory access (e.g., address of instructions that read or write to memory and range of memory operated upon by the application), traffic direction, and the like into the respective dataset. The result of the extraction is a set of concatenated functions, threads, memory access instructions, and such that handle user provided data processed by the framework. The method may capture the contents of each memory access (read/write) in the application. Then, by tracing the memory access and comparing the dataset with the memory access, the method may identify which instructs (read/write) in the application participate in processing user data. By capturing these functions, memory access, instructions, and such, the method can isolate one or more potential vulnerabilities of the application or framework that need to be examined in more detail at run time. At run time, these identified instructions can be exercised in isolation to determine if they mishandle craftily and maliciously created user data received at the framework (e.g., in a web facing application request). Further, by not including (dropping from the datasets) the functions that do not process identified user instructions, the method can avoid searching deeper on those dropped functions, thereby improving the efficiency of the instrumentation probing web facing application activities.

At step 660 of the method, the pattern matching/machine learning engine correlates the relationships between the functions, queries, thread IDs, memory accesses, and data packets of the respective datasets based on the data in parameters and fields of the functions, queries, thread IDs, memory accesses and data packets. The correlation may create chains of threads, functions, instructions, or such in the datasets that must be checked at run time to prevent vulnerabilities from being exploited. The correlation may further include correlating the data packets and functions of the first dataset to the functions and queries of the second dataset based on the user of context data structures to trace and map the processes/threads between the first data stream and second data stream. The tracing and mapping may create thread ID chains, which are used to establish per user context of the application. The tracing and mapping of the processes/threads may be performed by the placing and processing of identifying information (user, session, and such) into the Cross-Context containers and local/inter process communications (LPC/IPC) within the framework. The correlation between the first dataset and second dataset may result in a cumulative dataset that indicate the end-to-end processing across the framework for a particular web facing application. At step 670, the method programs the cumulative dataset at an analyzer (analysis engine) to tune the analyzer to probe activities of the particular web facing application based on the dataset to detect security attacks. During the probing, the chains of threads, function, instruction, and such in the dataset may be identified at run time, and used by the method to add user context on the output side of each function, remove the context from the inputs, and report the same to an analysis engine.

Application Runtime Monitoring and Analysis (ARMAS) Infrastructure

Figure 7A:
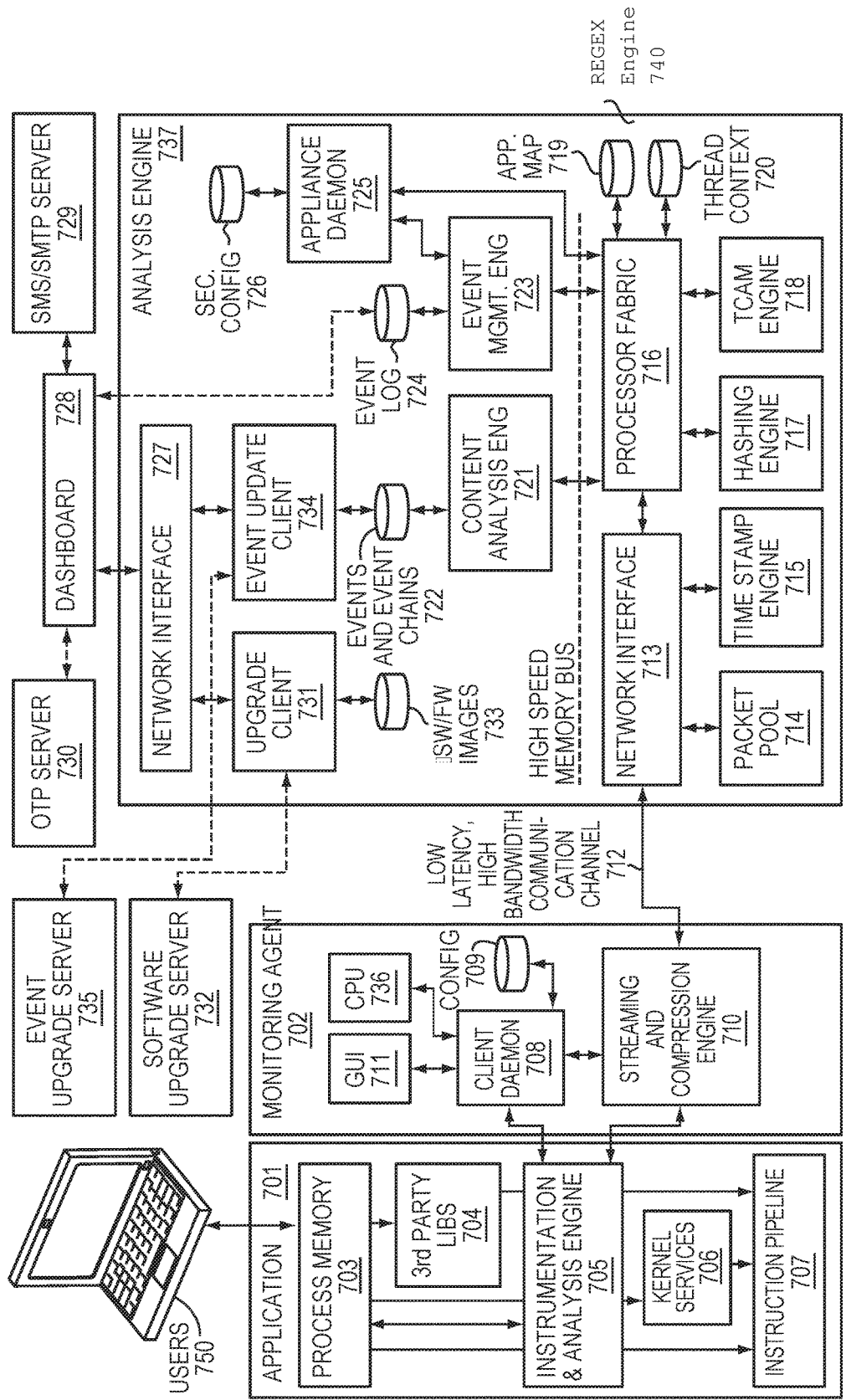
FIG. 7A illustrates an example block diagram of the application runtime monitoring and analysis (ARMAS) in embodiments of the present disclosure.

FIG. 7A depicts a high level block diagram of an example application runtime monitoring and analysis (ARMAS) infrastructure. The dataset generated from the systems and methods of FIGS. 2-6 may be used to tune the Analysis Engine 737 to monitor and analyze activities related to a particular application. This infrastructure may be configured on a various hardware including computing devices ranging from smartphones, tablets, laptops, desktops to high end servers. As shown in this figure, data collection performed by the Monitoring Agent 702 may be segregated from analysis performed by the Analysis Engine 737 to reduce imposing overheads on the application and thereby reducing its performance. The infrastructure provides high availability to prevent hackers from subverting its protection against malware attacks. The Monitoring Agent 702 interacts with an application to gather load time and runtime data. In some embodiments, the Monitoring Agent 702 may be the packet capture tools and profilers of FIGS. 4 and 5 to capture data streams received and processed by the application framework. The Monitoring Agent 702 may communicate may further communicate with a pattern matching/machine learning engine to generate a dataset from the captured data streams.

The infrastructure of the application 701 includes process memory 703, third-party libraries 704, kernel services 706, and an instruction pipeline 707. The infrastructure of the Monitoring Agent 702 includes the Instrumentation & Analysis Engine (instrumentation engine) 705, graphical user interface (GUI) 711, Client Daemon 708, Configuration database 709, and Streaming and Compression Engine 710, and central processing unit (CPU) 736. Local or remote users 750 of the application 701 interact with the application either through devices like keyboards, mice or similar I/O devices or over a network through a communication channel that may be established by means of pipes, shared memory or sockets. In response the application process 703 dispatches appropriate sets of instructions into the instruction pipeline 707 for execution. The application may also leverage its own or third party libraries 704 such as libc.so (Linux) or msvcrtxx.dll (Windows). As functionality from these libraries is invoked, appropriate instructions from these libraries are also inserted into the instruction pipeline for execution 707. In addition the application may leverage system resources such as memory, file I/O etc. from the kernel 706. These sequences of instructions from the application, libraries and the kernel put together in a time ordered sequence deliver the application functionality desired by a given user.

As the application's code begins to load into memory, the instrumentation engine 705 performs several different load time actions. Once all the modules have loaded up, the instrumented instructions of the application generate runtime data. The Client Daemon 708 initializes the Instrumentation and Analysis Engine 705, the Streaming Engine 710 and the GUI 711 processes in the CPU at 736 by reading one or more configuration files from the Configuration database 709. It also initializes intercommunication pipes between the instrumentation engine, Streaming Engine, GUI, Analysis Engine 737 and itself. The Client Daemon also ensures that if any Monitoring Agent 702 process, including itself, becomes unresponsive or dies, it will be regenerated. This ensures that the Monitoring Agent 702 is a high availability enterprise grade product.

The Instrumentation and Analysis Engine 737 pushes load and runtime data collected from the application into the Streaming Engine. The Instrumentation and Analysis Engine 737 may push data based on the dataset generated by the pattern matching/machine learning engine of FIGS. 4 and 5. The Streaming Engine packages the raw data from the Monitoring Agent 702 into the PDU. Then it pushes the PDU over a high bandwidth, low latency communication channel 712 to the Analysis Engine 737. If the Monitoring Agent 702 and the Analysis Engine 737 are located on the same machine this channel can be a memory bus. If these entities are located on different hardware but in the same physical vicinity, the channel can be an Ethernet or Fiber based transport, which allows remote connections to be established between the entities to transport the load and runtime data across the Internet.

The infrastructure of the Analysis Engine 737 includes the Network Interface Card (NIC) 713, the Packet Pool 714, the Time Stamp Engine 715, the Processor Fabric 716, the Hashing Engine 717, the TCAM Engine 718, the Application Map database 719, and the Thread Context database 720, which makes up the REGEX Engine 740. The infrastructure of the Analysis Engine 737 further includes the Content Analysis Engine 721, the Events and Event Chains 722, the Event Management Engine 723, the Event Log 724, the Application Daemon 725, the Analysis Engine Configuration database 726, the Network Interface 727, the Dashboard or CMS 728, the SMS/SMTP Server 729, the OTP Server 730, the Upgrade Client 731, the Software Upgrade Server 732, Software Images 733, the Event Update Client 734, and the Event Upgrade Server 735.

The PDU together with the protocol headers is intercepted at the Network Interface Card 713 from where the PDU is pulled and put into the Packet Pool 714. The timestamp fields in the PDU are filled up by the Time Stamp Engine 715. This helps to make sure that no packet is stuck in the packet Pool buffer for an inordinately long time.

The Processor Fabric 716 pulls packets from the packet buffer and the address fields are hashed and replaced in the appropriate location in the packet. This operation is performed by the Hashing Engine 717. Then the Processor Fabric starts removing packets from the packet buffer in the order they arrived. Packets with information from the load time phase are processed such that the relevant data is extracted and stored in the Application Map database 719. Packets with information from the runtime phase are processed in accordance with FIG. 6. The efficiency of the Analysis Engine 737 can be increased or decreased based on the number of processors in the Processor Fabric.

The transition target data is saved in the Thread Context database 720 which has a table for each thread. The Processor fabric also leverages the TCAM Engine 718 to perform transition and memory region searches. Since the processor fabric performing lookups using hashes, the actual time used is predictable and very short. By choosing the number of processors in the fabric carefully, per packet throughput can be suitable altered.

When the Analysis Engine 737 performs searches, it may, from time to time find an invalid transition, invalid operation of critical/admin functions or system calls, or find a memory write on undesirable locations. In each of these cases, the Analysis Engine 737 dispatches an event of the programmed severity as described by the policy stored in the Event and Event Chain database 722 to the Event Management Engine 723. The raw event log is stored in the Event Log Database 724. The Dashboard can also access the Event Log and display application status.

A remedial action is also associated with every event in the Event and Event Chain database 722. A user can set the remedial action from a range of actions from ignoring the event in one extreme to terminating the thread in the other extreme. A recommended remedial action can be recommended to the analyst using the Event Update Client 734 and Event Upgrade Server 735. In order to change the aforementioned recommended action, an analyst can use the Dashboard 728 accordingly. The Dashboard provides a GUI interface that displays the state of each monitored application and allows a security analyst to have certain control over the application, such as starting and stopping the application. When an event is generated, the Event Chain advances from the normal state to a subsequent state. The remedial action associated with the new state can be taken. If the remedial action involves a non-ignore action, a notification is sent to the Security Analyst using and SMS or SMTP Server 729. The SMS/SMTP address of the security analyst can be determined using an LDAP or other directory protocol. The process of starting or stopping an application from the Dashboard requires elevated privileges so the security analyst must authenticate using an OTP Server 730.

New events can also be created and linked into the Event and Event Chain database 722 with a severity and remedial action recommended to the analyst. This allows unique events and event chains for a new attack at one installation to be dispatched to other installations. For this purpose, all new events and event chains are loaded into the Event Upgrade Server 735. The Event Update Client 734 periodically connects and authenticates to the Event Upgrade Server 735 to retrieve new events and event chains. The Event Update Client then loads these new events and event chains into the Events and Events Chain database 722. The Content Analysis Engine 721 can start tracking the application for the new attacks encapsulated into the new event chains.

Just as with the Client Daemon, the Appliance Daemon 725 is responsible for starting the various processes that run on the Analysis Engine 737. For this purpose, it must read configuration information from the Analysis Engine Configuration database 726. The daemon is also responsible for running a heartbeat poll for all processes in the Analysis Engine 737. This ensures that all the devices in the Analysis Engine 373 ecosystem are in top working condition at all times. Loss of three consecutive heartbeats suggests that the targeted process is not responding. If any process has exited prematurely, the daemon will revive that process including itself.

From time to time, the software may be upgraded in the Appliance host, or of the Analysis Engine 737 or of the Client for purposes such as fixing errors in the software. For this purpose, the Upgrade Client 731 constantly checks with the Software Upgrade Server 732 where the latest software is available. If the client finds that the entities in the Analysis Engine 737 or the Client are running an older image, it will allow the analysts to upgrade the old image with a new image from the Software Upgrade Server 732. New images are bundled together as a system image 733. This makes it possible to provision the appliance or the host with tested compatible images. If one of the images of a subsystem in the Analysis Engine 737 or the Monitoring Agent 702 does not match the image for the same component in the System image, then all images will be rolled to a previous known good system image.

PDU for ARMAS Communications

Figure 7B:
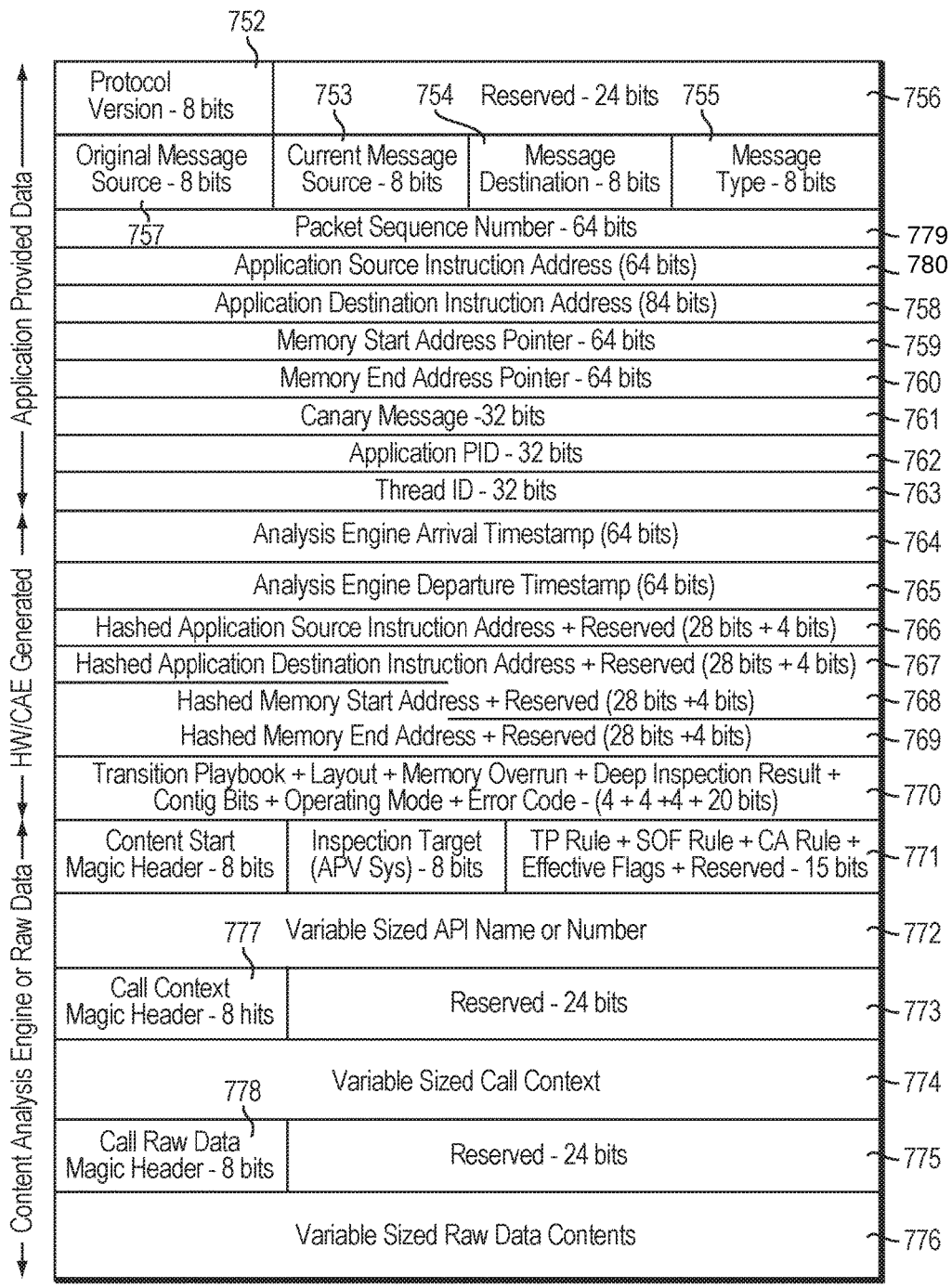
FIG. 7B illustrates an example protocol data unit (PDU) used to transmit data within the ARMAS infrastructure of FIG. 7A.

FIG. 7B illustrates an example protocol data unit (PDU) used to transmit data between the Monitoring Agent 702 and Analysis Engine 737 of FIG. 7A. In order for the Monitoring Agent 702 and the Analysis Engine 737 to work effectively with each other, they communicate with each other using the PDU. The PDU can specifically be used by the Monitoring Agent 702 to package the extracted model of the application and/or collected runtime data for transmission to the Analysis Engine 737. The PDU contains fields for each type of information to be transmitted between the Monitoring Agent 702 and the Analysis Engine 737. The PDU is divided into the Application Provided Data Section, the HW/CVE Generated, and Content Analysis Engine or Raw Data sections.

The Application Provided Data Section contains data from various registers as well as source and target addresses that are placed in the various fields of this section. The Protocol Version contains the version number of the PDU 752. As the protocol version changes over time, the source and destination must be capable of continuing to communicate with each other. This 8 bit field describes the version number of the packet as generated by the source entity. A presently unused reserved field 756 follows the Protocol Version field.

The next field of the Application Provided Data Section is the Message Source/Destination Identifiers 757, 753, and 754 are used to exchange traffic within the Analysis Engine infrastructure as shown in FIG. 7A. From time to time, the various entities shown in FIG. 7, exchange traffic between themselves. Not all these devices have or need IP addresses and therefore, the two (hardware and host) Query Router Engines uses the Message Source and Destination fields to route traffic internally. Some messages need to go across the network to entities in the Analysis Engine 737. For this purpose, the entities are assigned the following IDs. A given Analysis Engine appliance may have more than one accelerator card. Each card will have a unique IP address; therefore, the various entities will have a unique ID. The aforementioned infrastructure may also be running more than one application. Since each application server will have a unique IP address, the corresponding Monitoring Agent side entity will also have a unique ID.

Monitoring Agent Side Entities
1. GUI
2. Instrumentation and Analysis Engine
3. Client Message Router
4. Streaming Engine
5. Client Side Daemon
6. CLI Engine
7. Client Watchdog
8. Client Compression Block 9. Client iWarp Ethernet Driver (100 Mb/1 Gb/10 Gb)

Per PCI Card Entities (starting address=20+n*20)
20. Securalyzer TOE block
21. Securalyzer PCI Bridge
22. Decompression Block
23. Message Verification Block
24. Packet Hashing Block
25. Time-Stamping Block
26. Message Timeout Timer Block
27. Statistics Counter Block
28. Securalyzer Query Router Engine
29. Securalyzer Assist Securalyzer Host Entities
200. Securalyzer PCIe Driver
201. Host Routing Engine
202. Content Analysis Engine
203. Log Manager
204. Daemon
205. Web Engine
206. Watchdog
207. IPC Messaging Bus
208. Configuration Database
209. Log Database SIEM Connectors
220. SIEM Connector 1—Virsec Dashboard
221. SIEM Connector 2—HP ArcSight
222. SIEM Connector 3—IBM QRadar
223. SIEM Connector 4—Alien Vault USM Securalyzer Infrastructure Entities
230. Virsec dashboard
231. SMTP Server
232. LDAP Server
233. SMS Server
234. Entitlement Server
235. Database Backup Server
236. OTP Client
237. OTP Server
238. Checksum Server
239. Ticketing Server
240. Virsec Rules Server
241. Virsec Update Server All User Applications
255. User Applications—Application PID is used to identify the application issuing a query Another field of the Application Provided Data section is the Message Type field which indicates the type of data being transmitted 755. At the highest level, there are three distinct types of messages that flow between the various local Monitoring Agent side entities, between the Analysis Engine appliance side entities and between Client side and appliance side entities. Furthermore, messages that need to travel over a network must conform to the OSI model and other protocols.

The following field of the Application Provided Data section is the Packet Sequence Number field containing the sequence identifier for the packet 779. The Streaming Engine will perform error recovery on lost packets. For this purpose it needs to identify the packet uniquely. An incrementing signed 64 bit packet sequence number is inserted by the Streaming Engine and simply passes through the remaining Analysis Engine infrastructure. If the sequence number wraps at the 64 bit boundary, it may restart at 0. In the case of non-application packets such as heartbeat or log message etc., the packet sequence number may be −1.

The Application Provided Data section also contains the Canary Message field contains a canary used for encryption purposes 761. The Monitoring Agent 702 and the Analysis Engine 737 know how to compute the Canary from some common information but of a fresh nature such as the Application Launch time, PID, the license string, and an authorized user name.

The Application Provided Data section additionally contains generic fields that are used in all messages. The Application Source Instruction Address 780, Application Destination Instruction Address 758, Memory Start Address Pointer 759, Memory End Address Pointer 760, Application PID 762, Thread ID 763, Analysis Engine Arrival Timestamp 764, and Analysis Engine Departure Timestamp 765 fields which hold general application data.

The PDU also contains the HW/CAE Generated section. In order to facilitate analysis and to maintain a fixed time budget, the Analysis Engine 737 hashes the source and destination address fields and updates the PDU prior to processing. The HW/CAE Generated section of the PDU is where the hashed data is placed for later use. This section includes the Hashed Application Source Instruction Address 766, Hash Application Destination Instruction Address 767, Hashed Memory Start Address 768, and Hashed Memory End Address 769 fields. The HW/CAW Generated section additionally contains other fields related to the Canary 771 including the Hardcoded Content Start Magic header, API Name Magic Header, Call Context Magic Header and Call Raw Data Magic Header are present in all PDU packets.

The HW/CAW Generated section also includes a field 770 to identify other configuration and error data which includes Result, Configuration Bits, Operating Mode, Error Code, and Operating Modes data. The Result part of the field is segmented to return Boolean results for the different Analysis Engine queries—the transition playbook, the code layout, the Memory (Stack or Heap) Overrun, and the Deep Inspection queries. The Configuration Bits part of the field indicates when a Compression Flag, Demo Flag, or Co-located Flag is set. The presence of the flag in this field indicates to the Analysis Engine 737 whether the packet should be returned in compression mode. The Demo Flag indicates that system is in demo mode because there is no valid license for the system. In this mode, logs and events will not be available in their entirety. The Co-located Flag indicates that the application is being run in the Analysis Engine 737 so that Host Query Router Engine can determine where to send packets that need to return to the Application. If this flag is set, the packets are sent via the PCI Bridge, otherwise they are sent over the Ethernet interface on the PCI card. The Operating Mode part of the field indicates whether the system is in Paranoid, Monitor, or Learn mode. These modes will be discussed in more details later in this section. Lastly, the Error Code part of the field indicates an error in the system. The first eight bits of the error code will correspond to the message source. The remaining 12 bits will correspond to the actual error reported by each subsystem.

The PDU also contains the Content Analysis Engine or Raw Data. All variable data such as arguments and return value of the OS library calls and System Calls is placed in this section of the PDU. The data in this section contains the content of the data collected from the application and is primarily targeted at the Content Analysis Engine 721. This section contains the Variable Sized API Name or Number 772, the Call Content Magic Header 777, the Variable Sized Call Content 774, the Call Raw Data Magic Header 778, Variable Sized Raw Data Contents 776, and two reserved 773 and 775 fields. Furthermore, these fields can be overloaded for management messages.

Digital Processing Environment

Figure 8:
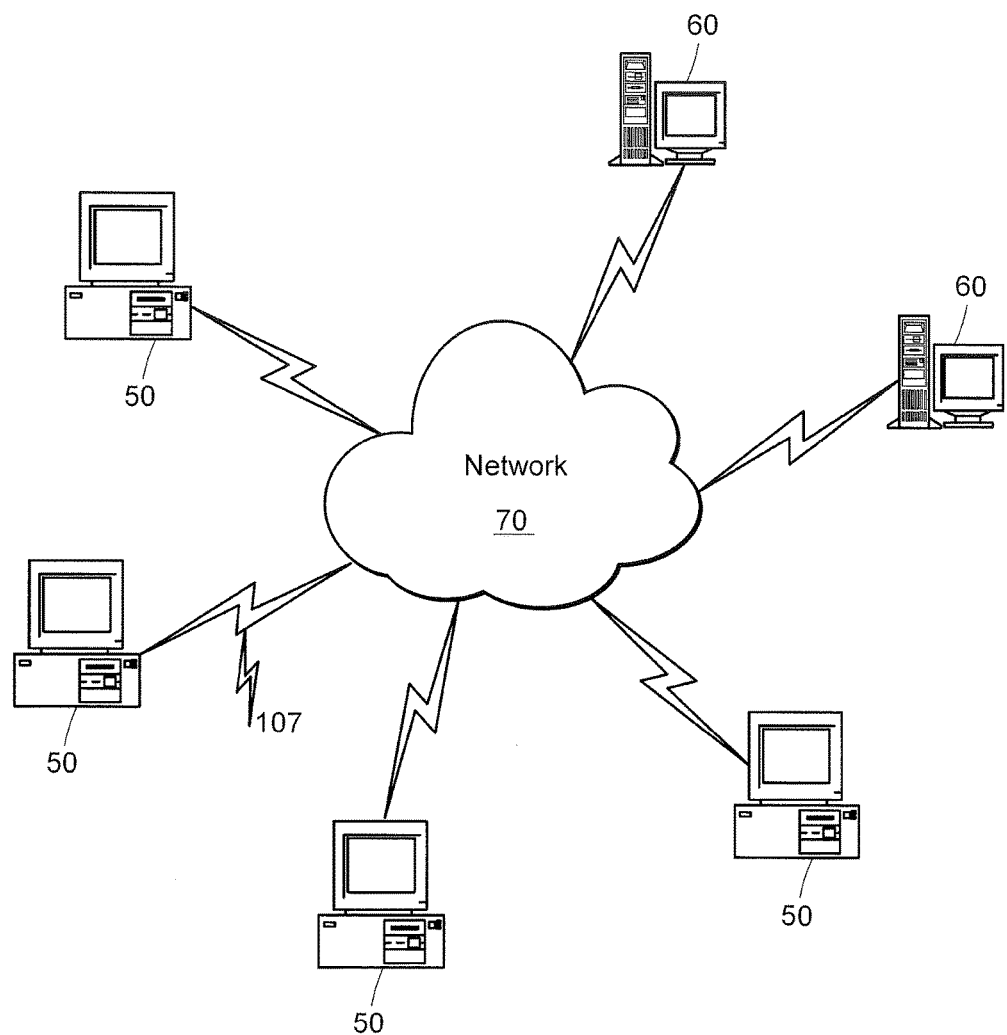
FIG. 8 illustrates a computer network or similar digital processing environment in which embodiments of the present disclosure may be implemented.

FIG. 8 illustrates a computer network or similar digital processing environment in which embodiments of the present disclosure may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, local area or wide area networks, and gateways that currently use respective protocols (TCP/IP, Bluetooth®, etc.) to communicate with one another. Other electronic device/computer network architectures are suitable.

Client computers/devices 50 may be configured as packet capture tools or profilers that capture data packets, functions, and/or database queries triggered by the processing pipeline in a web facing application framework. Server computers 60 may be configured as a pattern matching/machine learning engine that matches and correlates the data packets, functions, and database queries captured by the client computer/devices 50 into one or more datasets. The server computers 60 may not be separate server computers but part of cloud network 70. In some embodiments, the server computer 60 may further transmit the one or more datasets to a second server computer 60 configured as an analyzer (analysis engine). The second server computer 60 tunes the analyzer based on the one or more datasets to listen for processing activities (received data packets, triggered functions, and triggered database queries) related to a particular web facing application to detect security events. In some embodiments, the client 50 and server 60 may include client applications or components executing on the client and server for performing the capturing, correlating, and tuning as described.

Figure 9:
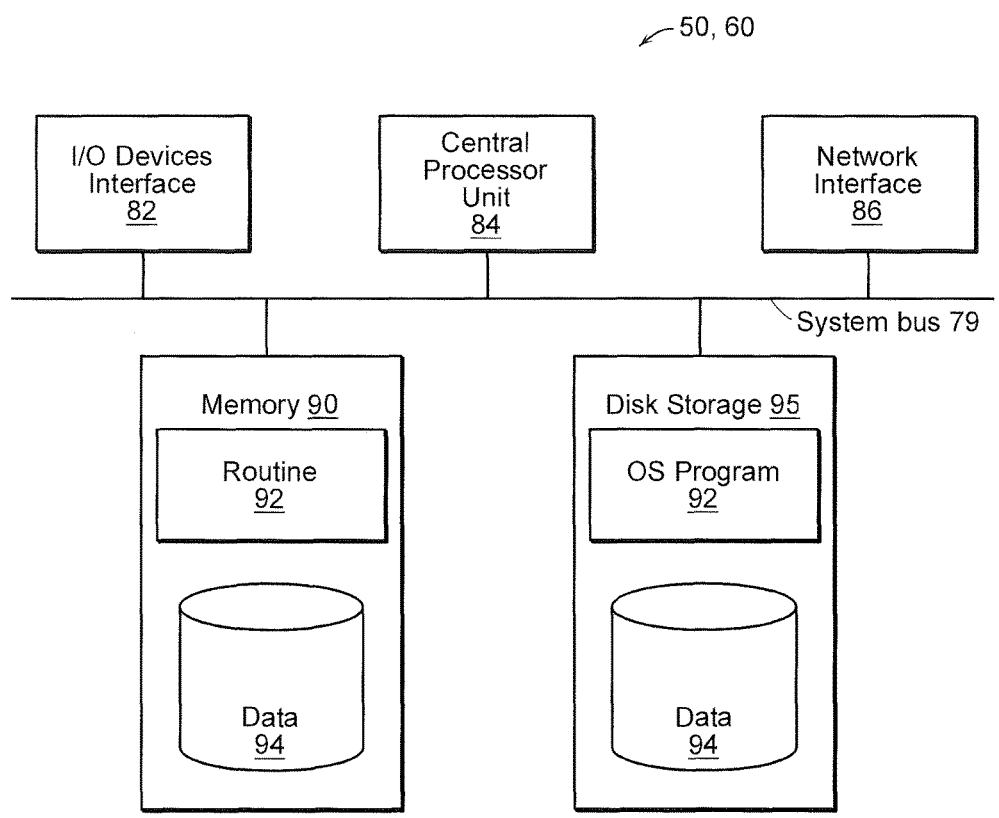
FIG. 9 illustrates a diagram of an example internal structure of a computer (e.g., client processor/device or server computers) in the computer system of FIG. 8.

FIG. 9 is a diagram of an example internal structure of a computer (e.g., client processor/device 50 or server computers 60) in the computer system of FIG. 8. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 8). Memory 90 provides volatile storage for computer software instructions 92 and data 94 used to implement an embodiment of the present disclosure (e.g., security monitoring agent, instrumentation engine, and analysis engine elements described herein). Disk storage 95 provides non-volatile storage for computer software instructions 92 and data 94 used to implement an embodiment of the present disclosure. A central processor unit 84 is also attached to the system bus 79 and provides for the execution of computer instructions.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While this disclosure has been particularly shown and described with references to example embodiments thereof, it will be understood by those skilled in the art that various changes in form and details may be made therein without departing from the scope of the disclosure encompassed by the appended claims.

---

APPENDIX A

```
#ifndef IAEMSGTYPES_JAVA_HEADER
#define IAEMSGTYPES_JAVA_HEADER
#include <string.h>
#include <stddef.h>
#include <stdlib.h>
#include <stdarg.h>
#include <stdio.h>
#include <iostream>
#include <stdint.h>
/* Messages exchanged */
#define IAE_MSG_JAVA_MINIMUM_VALUE                              31
#define IAE_MSG_JAVA_MAXIMUM_VALUE                              50
#define IAE_MSG_VS_JAVA_HTTP_REQ_2_PLUS_1                       31
#define IAE_MSG_VS_JAVA_HTTP_RESP_2_PLUS_1                      32
#define IAE_MSG_VS_JAVA_AS_SQL_2_PLUS_1                     33
#define IAE_MSG_VS_JAVA_AS_HTTP_REQ_1_PLUS_1_PLUS_1             35
#define IAE_MSG_VS_JAVA_AS_HTTP_RESP_1_PLUS_1_PLUS_1        37
```

APPENDIX A

```
#define IAE_MSG_JAVA_APPL_START                      39
#define IAE_MSG_JAVA_APPL_GRACEFUL_TERM              40
#define IAE_MSG_TYPE_FRAGMENTED                      50
#define JIAE_MSG_TYPE_REQUEST                         0
#define JIAE_MSG_TYPE_RESPONSE            1
#pragma pack(push, 1)
typedef struct
{
    int16_t             MsgLen;
    int16_t             MsgType;
    char                MsgDirection;
    char                reserved[3];
    int32_t             FragIndex; // Index number for each packets
    int64_t             FragIdentification; // Identification for each
                        fragmentation stream
    int32_t             actualLength;
    char                *Payload; // Original packets encapsulated here
} VS_APP_FRAGMENTATION;
#pragma pack(pop)
#pragma pack(push, 1)
typedef struct
{
    int16_t             MsgLen;
    int16_t             MsgType;
    char                MsgDirection;
    char                reserved[3];
    int64_t             PID;
    int64_t             ThreadID;
    int32_t             AppNameLength;
    char                *UserAppName;
} IAE_JAVA_APP_START_DATA, IAE_JAVA_APP_TERMINATE_DATA, IAE_JAVA_APP_LAUNCH_DATA,
IAE_JAVA_APP_STATE_CHANGE;
#pragma pack(pop)
#pragma pack(push, 1)
typedef struct
{
    int32_t             keyLength;
    int32_t             valueLength;
    char                *key;
    char                *value;
} VS_HTTP_PARAMERTERS;
#pragma pack(pop)
#pragma pack(push, 1)
typedef struct
{
    int16_t             MsgLen; // Len is also copied to varsz_rawdata
    int16_t             MsgType; // goes into variable data after RPDU
    char                MsgDirection;
    char                reserved[3];
    int64_t             PID;
    int64_t          ThreadID;
    int32_t          remote_port;      // = > end user browser socket port
    int64_t          remote_ipaddress;    //= > end user IP address
    int32_t          sessionid_length;
    int32_t          uuid_length;       //=> E1E2 Glue /* char array */
    int32_t          url_length;
    int32_t          httpvalue_length;    /* lenght of value's byte array */
    int32_t          severity;    /* threat level severity */
    int32_t          cummulative_score;    /* cummulative weight of all APIs */
    char             *sessionid;      /* character byte array */
    char             *uuid;             /* character byte array */
    char             *url;              /* character byte array */
    char    *httpvalue;    /* byte array of http form data value */
} VS_JAVA_HTTP_REQ_2_PLUS_1;
#pragma pack(pop)
#pragma pack(push, 1)
typedef struct
{
    int16_t             MsgLen;
    int16_t             MsgType;
    char                MsgDirection;
    char                reserved[3];
    int64_t             PID;
    int64_t          ThreadID;
    //int32_t           remote_port;      // = > end user browser socket port
    //int64_t           remote_ipaddress;       //= > end user IP address
    int32_t          sessionid_length;
```

APPENDIX A

```
    int32_t           uuid_length;
    int32_t           url_length;
    int32_t           parameter_count;      // Numbers of http parameters
    int32_t           parameter_length;     // total length of http
                                            parameter array
int32_t severity;                /* threat level severity */
int32_t cummulative_score; /* cummulative weight of
                                            all the APIs */
int32_t   http_status;    /* HTTP RESPONSE status */
    char      *sessionid;        /* character byte array */
    char      *uuid;             /* character byte array */
    char      *url;              /* character byte array */
    VS_HTTP_PARAMERTERS httpParameters[20];
} VS_JAVA_HTTP_RESP_2_PLUS_1;
#pragma pack(pop)
#pragma pack(push, 1)
typedef struct
{
    int16_t           MsgLen;
    int16_t           MsgType;
    char              MsgDirection;
    char              reserved[3];
    int64_t           PID;
    int64_t           ThreadID;
    int32_t           remote_port;         // = > end user browser socket port
    int64_t           remote_ipaddress;    //= > end user IP address
    int32_t           uuid_length;
   int32_t   url_length;
    int32_t           SQL_length;
    int32_t           parameter_count;     // Numbers of http parameters
    int32_t           parameter_length;    // Numbers of http parameters
   int32_t   severity;   /* threat level severity */
   int32_t   cummulative_score;   /* cummulative weight of all
                                            the APIs */
    char *uuid;
    char *url;
    char              *SQL;
    VS_HTTP_PARAMERTERS httpParameters[20];
    //char            *httpParameters;
} VS_JAVA_AS_SQL_2_PLUS_1;
#pragma pack(pop)
// Union of all IAE messages data structures
typedef struct
{
    union
    {
      IAE_JAVA_APP_START_DATA app_start;
      IAE_JAVA_APP_LAUNCH_DATA app_launch;
      VS_JAVA_HTTP_REQ_2_PLUS_1 vs_java_http_req_2_plus_1;
      VS_JAVA_HTTP_RESP_2_PLUS_1 vs_java_http_resp_2_plus_1;
      VS_JAVA_AS_SQL_2_PLUS_1 vs_java_as_sql_2_plus_1;
    };
} IAE_JAVA_MSG;
#endif
```

What is claimed is:

1. A computer implemented method comprising:
capturing data streams received at a framework of a web facing application;
capturing a first set of functions triggered by the framework processing the data streams;
matching a subset of the captured first set of functions to data packets of the captured data streams;
extracting the matched subset of the captured first set of functions and data of the data packets into a dataset;
identifying a chain of instructions used in processing the data streams by correlating functions and data packets in the extracted dataset, the chain of instructions being extracted into the dataset to represent vulnerabilities in the web facing application; and
detecting security attacks by probing activities of the web facing application based on the chain of instructions in the extracted dataset.

2. The method of claim 1, further comprising:
capturing a second set of functions triggered by the framework processing the data streams;
capturing database queries generated by the framework to a database server;
matching one or more of the captured database queries to a subset of the captured second set of functions; and
extracting the matched one or more captured database queries and the matched subset of the captured second set of functions into the extracted dataset.

3. The method of claim 2, further comprising:
correlating relationships between the matched data packets, the matched subset of the captured first set of functions, the matched subset of the captured second set of functions, and the one or more database queries, the correlating based on tracing threads used to process the matched subset of the captured first set of functions, the matched subset of the captured second set of functions, and the one or more database queries;

mapping the matched data packets, the matched subset of the captured first set of functions, the matched subset of the captured second set of functions, and the one or more database queries in the dataset based on the correlated relationships; and probing activities of the web facing application based on the mapping of the matched data packets, the matched subset of the captured first set of functions, the matched subset of the captured second set of functions, and the one or more database queries in the extracted dataset.

4. The method of claim 3, wherein matching the one or more of the captured database queries includes pattern matching data in parameters of one or more captured functions in the captured subset of the second set of functions to data in expressions of the captured one or more database queries.

5. The method of claim 3, wherein probing the activities further comprises:

capturing a data packet received at a framework of the web facing application at runtime;

capturing each triggered function of the matched subset of the captured first set of functions and the matched subset of the captured second set of functions in the extracted dataset in the dataset, and capturing each triggered database query of the captured database queries in the dataset at runtime;

for each triggered function of the first set of functions, checking for triggering of the mapped subset of the second set of functions and triggering of the mapped one or more database queries; and declaring a security attack when at least one of (i) the mapped subset of the second set of functions are not triggered and (ii) the mapped one or more data queries are not triggered.

6. The method of claim 2, wherein: (i) the subset of the first set of functions are triggered by the framework at an interface to a business logic layer of the framework, and (ii) the subset of the second set of functions are triggered by the framework at an interface from the business logic layer of the framework.

7. The method of claim 1, wherein matching the captured subset of the first set of functions includes pattern matching data in parameters of one or more captured functions in the captured subset of the first set of functions to data in fields of the data packets.

8. The method of claim 1, wherein capturing the data streams further comprises decrypting the data streams based on a protocol configuration of the framework.

9. The method of claim 1, further comprising extracting at least one of: user, user data, session information, IP address, port number, protocol context, thread ID, thread context, addresses of instructions that read or write to memory, range of operated on memory, and traffic direction from processing of the data streams into the extracted dataset for probing activities of the web facing application.

10. The method of claim 1, wherein the framework is configured in accordance with at least one programming language or programming language platform.

11. The method of claim 2, further comprising:

capturing contents of each memory access during the processing of the data stream in the framework; and wherein:

identifying the chain of instructions by comparing the extracted dataset with each captured memory access to identify instructions of the captured first set of functions and captured second set of functions used in processing user data; and probing the activities of the web facing application at runtime by monitoring for the chain of instructions, the probing including adding user content at output of each captured function and removing context from input of each captured function.

12. A computer system comprising:

at least one hardware processor configured to implement:

a first traffic analyzer configured to capture data streams received at a framework of a web facing application;

a first profiler configured to capture a first set of functions triggered by the framework processing the data streams;

a pattern matching engine configured to:

match a subset of the captured first set of functions to data packets of the captured data streams;

extract the matched subset of the captured first set of functions into a dataset; and identify a chain of instructions used in processing the data streams by correlating functions and data packets in the extracted dataset, the chain of instructions being extracted into the dataset to represent vulnerabilities in the web facing application; and a probe configured to detect security attacks by probing activities of the web facing application based on the chain of instructions in the extracted dataset.

13. The system of claim 12, further comprising: wherein the at least one hardware processor is further configured to implement:

a second profiler configured to capture a second set of functions triggered by the framework processing the data streams;

a second traffic analyzer configured to capture database queries generated by the framework to a database server; and the pattern matching engine is further configured to:

match one or more of the captured database queries to a subset of the captured second set of functions; and extract the matched one or more captured database queries and the subset of the captured second set of functions into the extracted dataset.

14. The system of claim 13, wherein:

the pattern matching engine is further configured to:

correlate relationships between the matched data packets, the matched subset of the captured first set of functions, the matched subset of the captured second set of functions, and the matched one or more database queries, the correlating based on tracing threads used to process the matched subset of the captured first set of functions, the matched subset of the captured second set of functions, and the matched one or more database queries; and map the matched data packets, the matched subset of the captured first set of functions, the matched subset of the captured second set of functions, and the matched one or more database queries in the extracted dataset based on the correlated relationships; and the probe is further configured to monitor activities of the web facing application based on the mapping of the matched data packets, the matched subset of the captured first set of functions, the matched subset of the captured second set of functions, and the matched one or more database queries in the extracted dataset.

15. The system of claim 14, wherein the at least one hardware processor is further configured to implement:

a third traffic analyzer configured to capture a data packet received at the framework of a web facing application at runtime;

a third profiler configured to capture each triggered function of the matched subset of the captured first set of functions at runtime;

a fourth profiler configured to capture each triggered function of the matched subset of the captured second set of functions in the extracted dataset in the dataset at runtime, and a fourth traffic analyzer configured to capture each triggered database query of the captured database queries in the dataset at runtime;

the probe further configured to:
for each triggered function of the first set of functions, check for triggering of the mapped subset of the second set of functions and triggering of the mapped one or more database queries; and declare a security attack when at least one of (I) the mapped subset of the second set of functions are not triggered and (ii) the mapped one or more data queries are not triggered.

16. The system of claim 14, wherein matching the one or more of the captured database queries includes pattern matching data in parameters of the captured second set of functions to data in expressions of the captured one or more database queries.

17. The system of claim 12, wherein matching the first set of functions includes pattern matching data in parameters of the first set of functions to data in fields of the data packets.

18. The system of claim 12, wherein: (i) the subset of the first set of functions are triggered by the framework at an interface to a business logic layer of the framework, and (ii) the subset of the second set of functions are triggered by the framework at an interface from the business logic layer of the framework.

19. The system of claim 12, wherein the first traffic analyzer is further configured to decrypt the data streams based on a protocol configuration of the framework.

20. The system of claim 12, wherein the pattern matching engine is further configured to extract at least one of: user, user data, session information, IP address, port number, protocol context, thread ID, thread context, addresses of instructions that read or write to memory, range of operated on memory, and traffic direction from processing of the data streams into the extracted dataset for probing activities of the web facing application.

21. The system of claim 12, wherein the framework is configured in accordance with at least one programming language or programming language platform.

22. The system of claim 13, wherein:
the first profiler and second profiler are further configured to capture contents of each memory access during the processing of the data stream in the framework;
the pattern matching engine is further configured to:
identify the chain of instructions by comparing the extracted dataset with each captured memory access to identify instructions of the captured functions used in processing user data;
create a chain of the identified instructions, the created chain extracted to the dataset to represent vulnerabilities in the web facing application; and
the probe further configured to monitor the activities of the web facing application by monitoring for the chain of instructions at runtime, the monitoring including adding user content at output of each captured function, removing context from input of each captured function, and reporting the adding and removing to an analysis engine.

* * * * *